(12) United States Patent
Jian

(10) Patent No.: US 11,050,909 B1
(45) Date of Patent: Jun. 29, 2021

(54) QUICK INSTALLATION PLATE WITH MOBILE PHONE CLIPPING FUNCTION

(71) Applicant: Guangdong Benro Image Technology Industrial Co., Ltd., Zhongshan (CN)

(72) Inventor: Jianghua Jian, Xiaoxishi Town (CN)

(73) Assignee: Guangdong Benro Image Technology Industrial Co., Ltd., Zhongshan (CN)

( * ) Notice: Subject to any disclaimer, the term of this patent is extended or adjusted under 35 U.S.C. 154(b) by 0 days.

(21) Appl. No.: 16/891,788

(22) Filed: Jun. 3, 2020

(30) Foreign Application Priority Data

Dec. 19, 2019 (CN) .......................... 201922303802.0

(51) Int. Cl.
*F16M 11/00* (2006.01)
*F16M 11/10* (2006.01)
*F16M 11/24* (2006.01)
*G03B 17/56* (2021.01)
*A47G 1/10* (2006.01)
*H04N 5/225* (2006.01)
*H04M 1/04* (2006.01)

(52) U.S. Cl.
CPC ............ *H04N 5/2253* (2013.01); *H04M 1/04* (2013.01)

(58) Field of Classification Search
None
See application file for complete search history.

(56) References Cited

U.S. PATENT DOCUMENTS

| 6,579,017 | B2* | 6/2003 | Wei | G03B 17/00 |
| | | | | 248/168 |
| 8,780,263 | B2* | 7/2014 | Orf | F16M 13/04 |
| | | | | 348/373 |
| 8,794,575 | B2* | 8/2014 | Vogt | G03B 17/561 |
| | | | | 248/177.1 |
| 9,416,914 | B1* | 8/2016 | Fan | F16M 11/24 |
| 9,420,712 | B2* | 8/2016 | Yang | F16M 11/38 |
| 10,178,209 | B1* | 1/2019 | Hesse | H04M 1/04 |
| 10,222,794 | B2* | 3/2019 | Deng | F16M 11/10 |
| 10,254,632 | B2* | 4/2019 | Tian | F16M 11/38 |
| 10,348,874 | B2* | 7/2019 | Penfold | A45C 11/00 |
| 10,365,543 | B2* | 7/2019 | O'Neill | A45F 5/10 |
| 10,365,544 | B2* | 7/2019 | Johnson | F16M 11/16 |
| 10,386,012 | B2* | 8/2019 | Balmer | F16M 13/00 |
| 10,718,464 | B2* | 7/2020 | Li | F16M 11/10 |
| 10,901,301 | B2* | 1/2021 | Jankura | G03B 17/561 |
| 2003/0081953 | A1* | 5/2003 | Wei | G03B 17/00 |
| | | | | 396/428 |

(Continued)

*Primary Examiner* — Tuan A Tran
(74) *Attorney, Agent, or Firm* — Wang Law Firm, Inc.

(57) ABSTRACT

A quick installation plate with a mobile phone clipping function includes a bottom plate and a camera screw on the bottom plate. Both sides of the bottom plate have a dovetail slot lockable by a tripod head; the bottom plate has a mobile phone clipping device that can be rotated and opened to clamp a mobile phone; the mobile phone clipping device has a first pin, two rotary arms rotatable around the first pin, and a moving part installed at an end of the rotary arm and can be pulled longitudinally along the rotary arm; the rotary arm has a connection structure elastically coupled to the moving part; the moving part is substantially n-shaped and has both ends disposed at the ends of the two rotary arms respectively; and the moving part has a second pin rotatable around the second pin to open the clamping part.

10 Claims, 5 Drawing Sheets

(56) References Cited

U.S. PATENT DOCUMENTS

| | | | | |
|---|---|---|---|---|
| 2005/0098692 A1* | 5/2005 | Yang | ............... | F16M 11/2071 |
| | | | | 248/163.1 |
| 2006/0175482 A1* | 8/2006 | Johnson | ............... | F16M 11/14 |
| | | | | 248/176.1 |
| 2008/0054131 A1* | 3/2008 | Joy | ............... | B60R 11/00 |
| | | | | 248/127 |
| 2009/0219436 A1* | 9/2009 | Overstreet | ............... | F16M 11/08 |
| | | | | 348/373 |
| 2013/0108255 A1* | 5/2013 | Vogt | ............... | F16M 11/041 |
| | | | | 396/428 |
| 2014/0097306 A1* | 4/2014 | Hale | ............... | F16M 11/041 |
| | | | | 248/122.1 |
| 2015/0362122 A1* | 12/2015 | Brown | ............... | F16M 11/38 |
| | | | | 348/208.2 |
| 2017/0108167 A1* | 4/2017 | Fan | ............... | F16M 11/041 |
| 2017/0119135 A1* | 5/2017 | Somoano | ............... | F16M 13/02 |
| 2018/0066792 A1* | 3/2018 | Chen | ............... | F16M 13/04 |
| 2018/0100615 A1* | 4/2018 | Becker | ............... | G03B 17/561 |
| 2018/0106418 A1* | 4/2018 | Anglin | ............... | F16M 13/00 |
| 2019/0094853 A1* | 3/2019 | Overall | ............... | H04N 5/225251 |
| 2019/0327407 A1* | 10/2019 | Yu | ............... | F16M 11/04 |
| 2020/0218139 A1* | 7/2020 | Tiefenbrunn | ............... | G03B 17/561 |

\* cited by examiner

US 11,050,909 B1

QUICK INSTALLATION PLATE WITH MOBILE PHONE CLIPPING FUNCTION

FIELD OF THE INVENTION

The present invention relates to the field of photography and camera equipment and more particularly to a quick installation plate with a mobile phone clipping function.

BACKGROUND OF THE INVENTION

Quick installation plate is generally used for installing and fixing a camcorder or a video camera onto a tripod head. Specifically, the camcorder or video camera is secured to a screw of the quick installation plate first, and then the quick installation plate is mounted and tightly onto the tripod head. However, the conventional quick installation plate has simple functions only and cannot install a mobile phone for taking pictures or videos, and thus the scope of applications is limited.

Therefore, the quick installation plate of the present invention is introduced.

SUMMARY OF THE INVENTION

In view of the aforementioned deficiencies of the prior art, it is a primary objective of the present invention to provide a quick installation plate with a simple structure and a multiple of functions such as clipping a mobile phone in addition to installing a camcorder or a video camera.

To achieve the aforementioned and other objectives, the present invention discloses a quick installation plate with a mobile phone clipping function as described as follows, Compared with the prior art, the present invention has the following advantages:

The quick installation plate of the present invention makes a simple structural change and adds a mobile phone clipping function based on the original function, so as to expand the scope of applications of the quick installation plate.

Although the quick installation plate of the present invention adds a new mobile phone clipping function to the conventional quick installation plate, the volume has not been increased, since the layout of the quick installation plate is skillfully changed, and the structure of the mobile phone clip is integrated with the main body of the quick installation plate with an aesthetic appearance without incurring additional material costs.

In the present invention, the rotary arm is rotated, and then the clamping part is rotated to open the mobile phone clip, so that the mobile phone clip can be opened or closed quickly and conveniently.

In the present invention, the inner side of the clamping arm and the bottom plate are adhered with a soft cushion to prevent damaging the mobile phone when it is clamped.

BRIEF DESCRIPTION OF NUMERALS USED IN THE DRAWINGS

Figure 1:
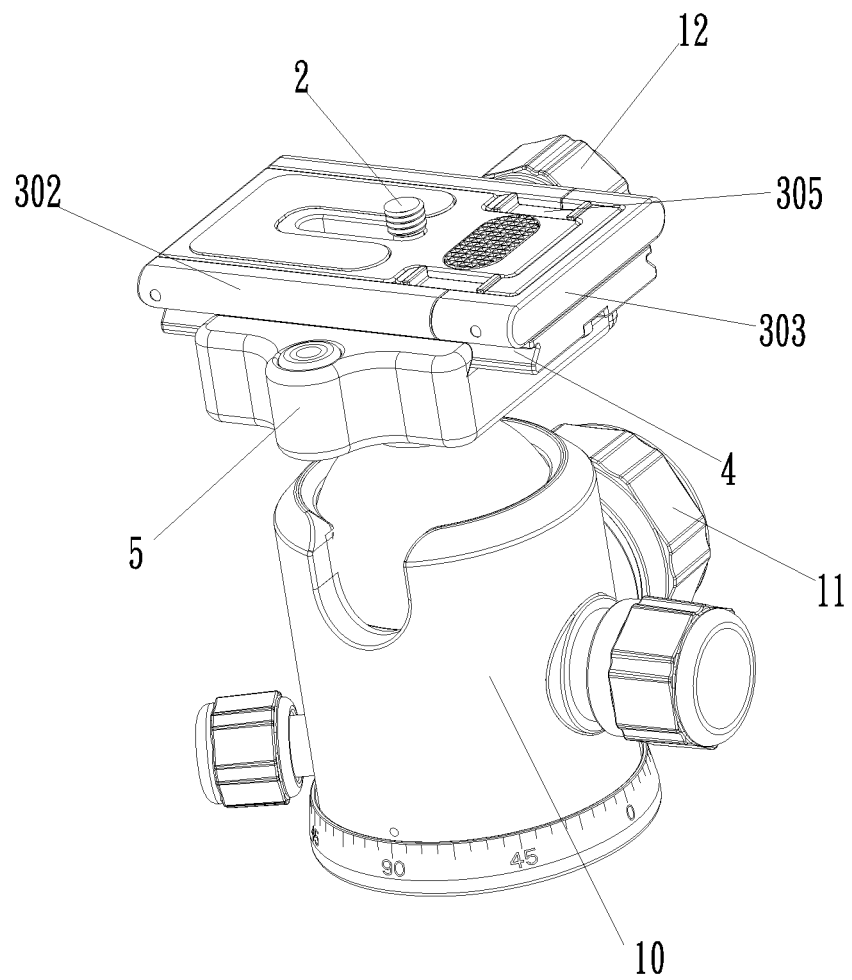
FIG. 1 is a schematic view of a quick installation plate installed onto a tripod head in accordance with the present invention.

1: Bottom plate; 101: Base portion; 102: Boss portion; 2: Camera screw; 3: Mobile phone clipping device; 301: First pin; 302: Rotary arm; 303: Moving part; 304: Second pin; 305: Clamping part; 306: Stepped hole; 307: Core stem; 308: Spring; 309: Screw; 4: Dovetail slot; 5: Locking device; 6: Cushion; 7: First vacancy; 8: Second vacancy; 9: Sliding slot; 10: Tripod head; 11: First knob; 12: Second knob.

DESCRIPTION OF THE PREFERRED EMBODIMENTS

The technical characteristics of the present invention will become apparent with the detailed description of preferred embodiments accompanied with the illustration of related drawings as follows.

With reference to FIGS. 1 to 5 for a quick installation plate with a mobile phone clipping function in accordance with the present invention, the quick installation plate with a mobile phone clipping function comprises a bottom plate 1, a camera screw 2 disposed on the bottom plate 1, a dovetail slot 4 formed on both sides of the bottom plate 1 and lockable by a tripod head 10, and a mobile phone clipping device 3 disposed on the bottom plate 1 and capable of being rotated and opened to clamp a mobile phone.

Figure 2:
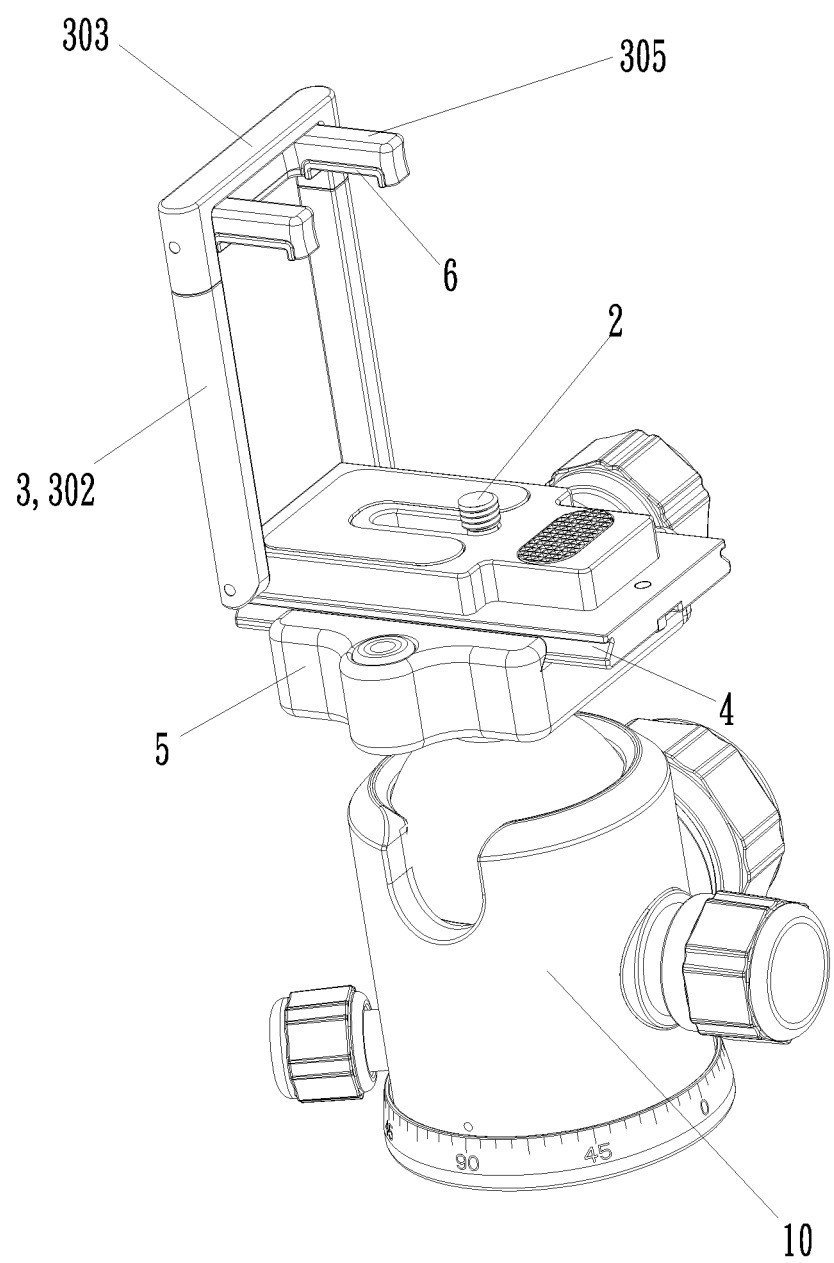
FIG. 2 is a perspective view of a quick installation plate installed onto a tripod head after a mobile phone clip is opened in accordance with the present invention.

With reference to FIGS. 1 and 2 for a quick installation plate installed onto a tripod head 10 in accordance with the present invention, the tripod head has a locking device 5 disposed thereon, and a first knob 11 of the tripod head can be rotated to adjust the installation angle of the locking device 5, and a second knob 12 of the locking device 5 can be rotated to lock the quick installation plate quickly, and the locking device 5 is a prior art such as P.R.C. Application No. 201020579623.6 entitled "Quick locking device". The present invention makes a simple structural change based on the original functions and adds a mobile phone clipping function to expand the scope of applications of the quick installation plate.

In the quick installation plate with a mobile phone clipping function, the mobile phone clipping device 3 comprises a first pin 301 disposed on a side of the bottom plate 1 and two rotary arms 302 rotatable around the first pin 301, and an end of the rotary arm 302 has a moving part 303 capable of being pulled longitudinally along the rotary arm 302, and the rotary arm 302 has a connection structure elastically coupled to the moving part 303, and the moving part 303 is substantially n-shaped, and both ends of the moving part 303 are disposed at the ends of the two rotary arms 302, and the moving part 303 has a second pin 304 1 that can be rotated to open the clamping part 305.

Figure 3:
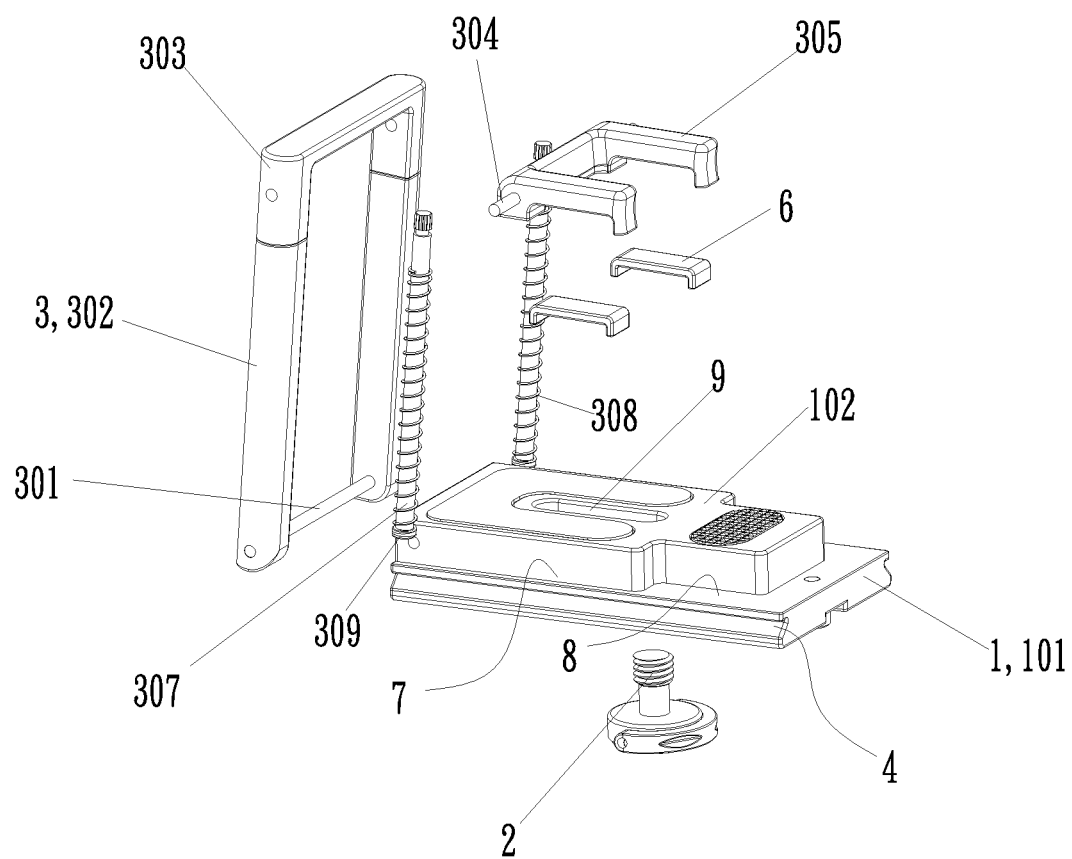
FIG. 3 is an exploded view of a quick installation plate in accordance with the present invention.
Figure 4:
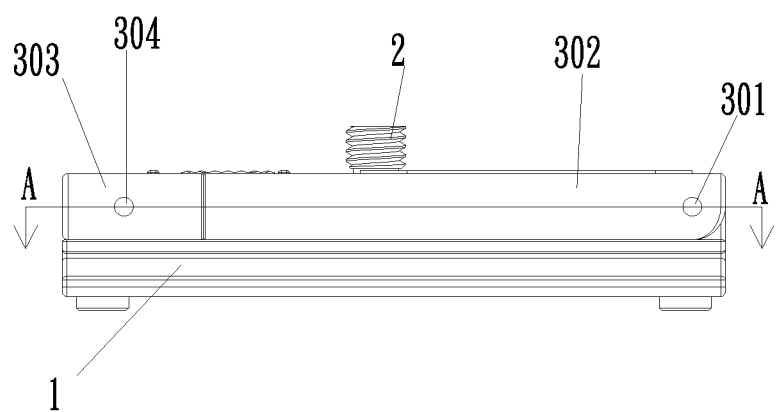
FIG. 4 is a planar side view of a quick installation plate in accordance with the present invention.

In FIGS. 2 and 3, the rotary arm 302 is rotated, and then the clamping part 305 is rotated, so that the mobile phone clip can be opened. Wherein, the mobile phone clip can be opened and closed quickly and conveniently.

Further, the connection structure comprises a stepped hole 306 longitudinally penetrating through the rotary arm 302, a core stem 307 passing through the stepped hole 306, and a spring 308 sheathed on the core stem 307, wherein the core stem 307 has an end fixedly coupled to the moving part 303 and the other end with a screw 309, and the spring 308 has an end pressing a nut of the screw 309 and the other end pressing a step of the stepped hole 306. The stepped hole 306 comprises a larger hole and a smaller hole communicating with each other, and the larger hole has an inner diameter greater than the inner diameter of the smaller hole, and the smaller hole is near the moving part 303, and the larger hole is away from the moving part 303.

Figure 5:
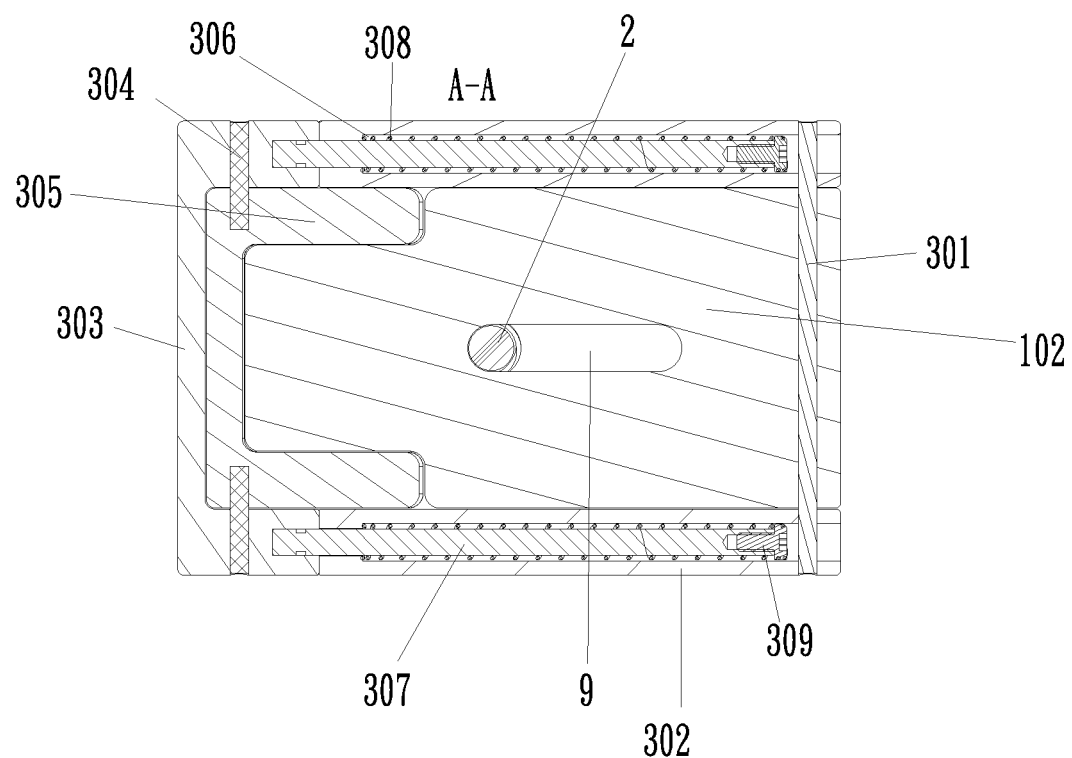
FIG. 5 is a cross-section view of Section A of FIG. 4.

During use as shown in FIGS. 3 and 5, the middle of the moving part 303 is pulled in a direction away from the bottom plate 1, and the core stem 307 is moved with the moving part 303, and the spring 308 is pulled and stretched and can be placed into the mobile phone. After the spring 308 is release, the spring 308 resumes its original position to clamp the mobile phone clip between clamping part 305 and the bottom plate 1 securely.

The clamping part 305 is a splint having two clamping arms, and the two clamping arms are provided for clamping the mobile phone securely, wherein the present invention preferably uses two clamping arms, so that plenty of room can be reserved for holding the moving part 303 by hands.

In the quick installation plate with a mobile phone clipping function, the inner side of the clamping arm is adhered with a soft cushion 6, and the bottom plate 1 also has a similar cushion as shown in FIG. 3 to prevent damaging the mobile phone.

In the quick installation plate with a mobile phone clipping function, the first pin 301 passes through the bottom plate 1. In the present invention, there are two second pins 304 disposed on both sides of the moving part 303 respectively as shown in FIG. 3.

In the quick installation plate with a mobile phone clipping function, the bottom plate 1 comprises a base portion 101 and a boss portion 102 integrally formed on the base portion 101, wherein the boss portion 102 has a width smaller than the width of the base portion 101, so that both sides of the boss portion 102 have a first vacancy 7. When the two rotary arms 302 are folded, the two rotary arms 302 are disposed on the first vacancy 7, and the boss portion 102 is substantially in a hollow inverted T-shape, so that both sides of the top of the boss portion 102 have a second vacancy 8. When the two rotary arms 302 are folded, the two clamping arms are disposed on the second vacancy 8.

In FIGS. 1 and 2, the quick installation plate of the present invention adds a mobile phone clipping function to the conventional quick installation plate without increasing the volume, but the invention skillfully changes the layout of the quick installation plate and integrates the structure of the mobile phone clip with the main body of the quick installation plate with an aesthetic appearance without incurring additional material costs.

In the quick installation plate with a mobile phone clipping function, the bottom plate 1 has a sliding slot 9 formed thereon, and the camera screw 2 is slidably disposed on the sliding slot 9, so that the quick installation plate of the present invention can be used for installing camcorders or video cameras of different models.

While the invention has been described by means of specific embodiments, numerous modifications and variations could be made thereto by those skilled in the art without departing from the scope and spirit of the invention as set forth in the claims.

What is claimed is:

1. A quick installation plate with a mobile phone clipping function, comprising a bottom plate (1), and a camera screw (2) disposed on the bottom plate (1), characterized in that both sides of the bottom plate (1) have a dovetail slot (4) lockable by a tripod head (10), and the bottom plate (1) has a mobile phone clipping device (3) that can be rotated and opened to clamp a mobile phone.

2. The quick installation plate with a mobile phone clipping function as claimed in claim 1, wherein the mobile phone clipping device (3) comprises a first pin (301) installed to a side of the bottom plate (1), two rotary arms (302) rotatable around the first pin (301), a moving part (303) installed at an end of the rotary arm (302) and capable of being pulled longitudinally along the rotary arm (302), and the rotary arm (302) has a connection structure installed thereon and elastically coupled to the moving part (303), and the moving part (303) is substantially n-shaped, and both ends of the moving part (303) are disposed at the ends of the two rotary arms (302) respectively, and the moving part (303) has a second pin (304) installed thereon and rotatable around the second pin (304) to open the clamping part (305).

3. The quick installation plate with a mobile phone clipping function as claimed in claim 2, wherein the connection structure comprises a stepped hole (306) longitudinally penetrating through the rotary arm (302), a core stem (307) passing through the stepped hole (306), and a spring (308) sheathed on the core stem (307), and the core stem (307) has an end fixedly coupled to the moving part (303) and the other end with a screw (309), and the spring (308) has an end pressing at a nut of the screw (309) and the other end pressing at a step of the stepped hole (306).

4. The quick installation plate with a mobile phone clipping function as claimed in claim 3, wherein the clamping part (305) is a splint.

5. The quick installation plate with a mobile phone clipping function as claimed in claim 3, wherein the clamping part (305) has two clamping arms.

6. The quick installation plate with a mobile phone clipping function as claimed in claim 5, wherein the clamping arm has a cushion (6) adhered to an inner side thereof.

7. The quick installation plate with a mobile phone clipping function as claimed in claim 5, wherein the bottom plate (1) comprises a base portion (101) and a boss portion (102) integrally formed and disposed above the base portion (101), and the boss portion (102) has a width smaller than the width of the base portion (101), so that both sides of the boss portion (102) have a first vacancy (7), and the two rotary arms (302) when folded are disposed on the first vacancy (7); and the boss portion (102) is in a hollow inverted T-shaped, so that both sides of the top of the boss portion (102) have a second vacancy (8), and the two clamping arms when folded are disposed on the second vacancy (8).

8. The quick installation plate with a mobile phone clipping function as claimed in claim 3, wherein the first pin (301) is passed through the bottom plate (1), and two of the second pin (304) are provided and disposed on both sides of the moving part (303) respectively.

9. The quick installation plate with a mobile phone clipping function as claimed in claim 3, wherein the stepped hole (306) includes a larger hole and a smaller hole communicating with each other, and the larger hole has an inner diameter greater than the inner diameter of the smaller hole, and the smaller hole is near the moving part (303), and the larger hole is away from the moving part (303).

10. The quick installation plate with a mobile phone clipping function as claimed in claim 3, wherein the bottom plate (1) has a sliding slot (9) formed thereon, and the camera screw (2) is slidably installed onto the sliding slot (9).

* * * * *